(12) United States Patent
Hodges (10) Patent No.: US 8,285,439 B2
(45) Date of Patent: Oct. 9, 2012

(54) SYSTEM AND METHOD FOR PERFORMING VEHICLE DIAGNOSTICS

(75) Inventor: Thomas A. Hodges, Riverview, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 411 days.

(21) Appl. No.: 12/419,714

(22) Filed: Apr. 7, 2009

(65) Prior Publication Data

US 2010/0256861 A1    Oct. 7, 2010

(51) Int. Cl.
*G01M 17/00* (2006.01)
*G06F 11/30* (2006.01)

(52) U.S. Cl. ............... 701/31.5; 701/29.1; 701/29.6; 701/31.4

(58) Field of Classification Search .......... 701/29, 701/32, 33, 29.1, 29.6, 31.4, 31.5
See application file for complete search history.

(56) References Cited

U.S. PATENT DOCUMENTS

| | | | |
|---|---|---|---|
| 5,781,125 A | 7/1998 | Gadau et al. | |
| 5,922,041 A | 7/1999 | Anderson | |
| 6,434,455 B1 | 8/2002 | Snow et al. | |
| 6,553,292 B2 | 4/2003 | Kokes et al. | |
| 6,598,183 B1 | 7/2003 | Grieco et al. | |
| 6,603,394 B2 | 8/2003 | Raichle et al. | |
| 6,611,740 B2 | 8/2003 | Lowrey et al. | |
| 6,636,790 B1 | 10/2003 | Lightner et al. | |
| 6,687,587 B2 | 2/2004 | Kacel | |
| 6,738,697 B2 | 5/2004 | Breed | |
| 6,778,888 B2 | 8/2004 | Cataldo et al. | |
| 6,978,198 B2 | 12/2005 | Shi | |
| 7,146,307 B2 | 12/2006 | Mocek | |
| 7,155,321 B2 | 12/2006 | Bromley et al. | |
| 7,228,211 B1 | 6/2007 | Lowrey et al. | |
| 7,232,962 B2 | 6/2007 | Rynd | |
| 7,340,365 B2 | 3/2008 | Wubbena et al. | |

(Continued)

FOREIGN PATENT DOCUMENTS

JP    9264819 A    10/1997

(Continued)

OTHER PUBLICATIONS

Kermit Whitfield, "A hitchhiker's guide to the telematics ecosystem", Automotive Design & Production, Oct. 2003, http://findarticles.com, pp. 1-3.

(Continued)

*Primary Examiner* — David Dunn
*Assistant Examiner* — Philip Gabler
(74) *Attorney, Agent, or Firm* — Jennifer M. Stec; Brooks Kushman P.C.

(57) ABSTRACT

One aspect includes a system for monitoring a vehicle's health status. The system comprises a vehicle monitoring computer system configured to (1) receive information associating a cell phone with a vehicle, (2) receive vehicle diagnostic information including vehicle conditions, (3) automatically determine a severity status for the vehicle conditions based on pre-defined severity status values, and (4) if the severity status for any vehicle condition exceeds a pre-defined severity threshold value, automatically transmit a text message to the cellular telephone. Another aspect includes a system for detecting and monitoring a vehicle's health status. The system comprises (1) a vehicle monitoring computer system and (2) a vehicle computer system configured to communicate wirelessly with a cellular telephone located within a vehicle or its vicinity to transmit diagnostic information to a telecommunications network for communication with the vehicle monitoring system.

17 Claims, 4 Drawing Sheets

U.S. PATENT DOCUMENTS

| | | | |
|---|---|---|---|
| 7,343,526 B2 | 3/2008 | Aditham | |
| 7,379,541 B2 | 5/2008 | Iggulden et al. | |
| 7,487,074 B2 | 2/2009 | Ohtsu et al. | |
| 7,532,962 B1 | 5/2009 | Lowrey et al. | |
| 7,590,476 B2 | 9/2009 | Shumate | |
| 8,126,644 B2 | 2/2012 | Amano | |
| 8,140,358 B1 | 3/2012 | Ling et al. | |
| 2002/0035429 A1 | 3/2002 | Banas | |
| 2002/0173885 A1 | 11/2002 | Lowrey et al. | |
| 2003/0034769 A1 | 2/2003 | Lipscomb et al. | |
| 2003/0036832 A1 | 2/2003 | Kokes et al. | |
| 2003/0163587 A1 | 8/2003 | Knight et al. | |
| 2004/0044454 A1* | 3/2004 | Ross et al. | 701/33 |
| 2004/0054503 A1 | 3/2004 | Namaky | |
| 2004/0128071 A1 | 7/2004 | Schradi et al. | |
| 2005/0096020 A1* | 5/2005 | Oesterling et al. | 455/414.2 |
| 2005/0097541 A1 | 5/2005 | Holland | |
| 2006/0034231 A1 | 2/2006 | Tailor | |
| 2006/0041348 A1 | 2/2006 | Liebl et al. | |
| 2006/0130033 A1 | 6/2006 | Stoffels et al. | |
| 2006/0155437 A1 | 7/2006 | Wang et al. | |
| 2006/0229777 A1 | 10/2006 | Hudson et al. | |
| 2006/0253235 A1 | 11/2006 | Bi et al. | |
| 2007/0162796 A1 | 7/2007 | Chan et al. | |
| 2007/0171029 A1* | 7/2007 | Inbarajan | 340/425.5 |
| 2007/0179799 A1* | 8/2007 | Laghrari | 705/1 |
| 2008/0015748 A1 | 1/2008 | Nagy | |
| 2008/0027605 A1* | 1/2008 | Oesterling | 701/33 |
| 2008/0027606 A1* | 1/2008 | Helm | 701/33 |
| 2008/0147267 A1 | 6/2008 | Plante et al. | |
| 2008/0167056 A1* | 7/2008 | Gilzean et al. | 455/466 |
| 2009/0177352 A1 | 7/2009 | Grau et al. | |
| 2009/0292416 A1 | 11/2009 | Ubik et al. | |
| 2009/0308134 A1 | 12/2009 | Pepper | |

FOREIGN PATENT DOCUMENTS

| | | |
|---|---|---|
| JP | 11326140 A | 11/1999 |
| JP | 2006018680 A | 1/2006 |

OTHER PUBLICATIONS

Ford Motor Company, "SYNC with Navigation System," Owner's Guide Supplement, SYNC System Version 1 (Jul. 2007).

Ford Motor Company, "SYNC," Owner's Guide Supplement, SYNC System Version 1 (Nov. 2007).

Ford Motor Company, "SYNC with Navigation System," Owner's Guide Supplement, SYNC System Version 2 (Oct. 2008).

Ford Motor Company, "SYNC," Owner's Guide Supplement, SYNC System Version 2 (Oct. 2008).

Ford Motor Company, "Navigation System: SYNC," Owner's Guide Supplement, SYNC Version 3 (Jul. 2009).

Ford Motor Company, "SYNC," Owner's Guide Supplement, SYNC Version 3 (Aug. 2009).

DrewTech gets you on the Bus, article printed from www.drewtech.com, Dec. 16, 2009.

The CarDAQ-Plus Advantage, Drew Technologies, Inc.

Software, Pass Thru Pro II, J2534 Flash Reprogramming, printed from buy1.snapon.com, Dec. 3, 2009.

Integrated Diagnostic System (IDS), Ford, Lincoln, Mercury.

Pegisys PC Diagnostic System, PC-based J2534 Reprogramming & Scan Tool, printed from www.otctools.com.

Introduction to J2534 and Flash Reprogramming, Drew Technologies, Copyright 2009.

CarDAQ-Plus, Drew Technologies, Inc.

Dynetics Vehicle Data Recorder Models DVG-II and WDVG-II (2009) printout from www.dynetics-ia.com.

* cited by examiner

SYSTEM AND METHOD FOR PERFORMING VEHICLE DIAGNOSTICS

BACKGROUND

1. Technical Field

In one or more embodiments, the present invention relates to a diagnostic system and a method of performing diagnostics and, more specifically, to a vehicle diagnostic system and method of performing vehicle diagnostics.

2. Background Art

The prior art contains various examples of systems and methods of communicating vehicle diagnostics between a vehicle and a remote terminal. U.S. Pat. No. 6,611,740 B2 issued to Lowrey et al is directed to an internet-based vehicle diagnostic system. Lowrey provides for a system for monitoring a vehicle that includes a wireless appliance in electrical contact with an in-vehicle computer. The wireless appliance features: 1) a data-collection component that supports communication software that collects diagnostic data from the computer and 2) a data-transmission component, in electrical communication with the data-collection electronics, configured to transmit an outgoing data packet comprising the diagnostic data over a network and receive over the same network an incoming data packet that modifies the communication software. The wireless appliance communicates with a host computer system that is configured to: 1) receive the outgoing data packet from the network; 2) process the outgoing data packet to generate a set of vehicle diagnostic data; 3) host a web site on the Internet that displays the vehicle diagnostic data; and 4) send out the incoming data packet over the same network to modify the communication software.

Additionally, U.S. Pat. No. 6,636,790 B1 issued to Lightner et al, is directed to a wireless diagnostic system and method for monitoring vehicles. Lightner provides for a method and apparatus for remotely characterizing a vehicle's performance. The method features the steps of: i) generating data representative of the vehicle's performance with at least one microcontroller disposed within the vehicle; ii) transferring the data through an OBD, OBD-II or equivalent electrical connector to a data collector/router that includes a microprocessor and an electrically connected wireless transmitter; iii) transmitting a data packet representing the data with the wireless transmitter over an airlink to a wireless communications system and then to a host computer; and iv) analyzing the data packet with the host computer to characterize the vehicle's performance.

US Publication No. 2002/0173885 for Lowrey et al is directed to an internet-based system for monitoring vehicles. Lowrey provides for a method for monitoring a vehicle that features the steps of: 1) generating a data packet including vehicle data retrieved from the vehicle using a wireless appliance; 2) transmitting the data packet over an airlink with the wireless appliance so that the data packet passes through a network and to a host computer system; 3) processing the data packet with the host computer system to generate a set of data; and 4) displaying the set of data on a web page hosted on the internet.

While the prior art provides tools useful for their purposes, what is needed is a vehicle diagnostic system and method of performing vehicle diagnostics that can provide a vehicle owner notice of severe vehicle conditions.

SUMMARY OF THE INVENTION

One aspect may include a system for monitoring vehicle health status for one or more vehicles. The system may include a vehicle monitoring computer system configured to receive information associating a cellular telephone with a vehicle. The vehicle monitoring system may associate the cellular telephone with the vehicle by associating the cellular telephone number with the vehicle identification number.

The vehicle monitoring computer system may be further configured to receive diagnostic information pertaining to a vehicle. The vehicle diagnostic information may include one or more vehicle conditions.

The vehicle monitoring computer system may be further configured to automatically determine a severity status for the one or more vehicle conditions based on a pre-defined set of severity status values for a plurality of vehicle conditions and, if the severity status for any of the vehicle conditions exceeds a pre-defined severity threshold value, automatically transmit a text message alert for the vehicle condition to the cellular telephone.

In some embodiments, the text message may additionally include an instruction for addressing the vehicle condition(s). Additionally or alternatively, the text message may include information for obtaining a vehicle health report for the vehicle. The information for obtaining a vehicle health report for the vehicle may include a hyperlink to the World Wide Web.

In one embodiment, the system may further include a vehicle computer system further configured to communicate wirelessly with the cellular telephone located within the vehicle, or in the vehicle vicinity, to transmit the vehicle diagnostic information wirelessly to a telecommunications network for communication to the vehicle monitoring system.

In one embodiment, the system may further include one or more triggers that are activated from the vehicle and configured to generate a request for a vehicle health status. The one or more triggers may include a voice activated trigger or a button trigger.

Another aspect may include a system for detecting and monitoring the vehicle health status for one or more vehicles. The system may include a vehicle computer system and a vehicle monitoring computer system.

The vehicle computer system may be configured to communicate wirelessly with a cellular telephone located within a vehicle, or in the vehicle vicinity, to transmit vehicle diagnostic information wirelessly to a telecommunications network for communication with a vehicle monitoring system. The vehicle computer system may be configured to communicate wirelessly using a BLUETOOTH connection.

The vehicle monitoring computer system may be configured to receive information associating the cellular telephone with the vehicle. The vehicle monitoring computer system may be further configured to receive diagnostic information pertaining to a vehicle. The vehicle diagnostic information may include one or more vehicle conditions.

The vehicle monitoring computer system may be further configured to automatically determine a severity status for the one or more vehicle conditions based on a pre-defined set of severity status values for a plurality of vehicle conditions and, if the severity status for any of the vehicle conditions exceeds a pre-defined severity threshold, automatically transmit a text message alert for the vehicle condition to the cellular telephone. The predefined set of severity status values may include a number of values defined by a rating of the condition's severity.

In some embodiments, the system may further include one or more triggers activated from the vehicle and configured to generate a request for a vehicle health status. The one or more triggers may include a voice activated trigger or a button trigger.

Another aspect may include a computer program product embodied in a computer readable medium having computer readable instructions for monitoring vehicle health status for one or more vehicles. The computer program product may include instructions for receiving information associating a cellular telephone with a vehicle. The cellular telephone may be associated with a vehicle by associating the cellular telephone number with the vehicle identification number.

The computer program product may further include instructions for receiving diagnostic information pertaining to a vehicle. The vehicle diagnostic information may include one or more vehicle conditions. The computer program product may further include instructions for automatically determining a severity status for the one or more vehicle conditions based on a pre-defined set of severity status values for a plurality of vehicle conditions and, if the severity status for any of the vehicle conditions exceeds a pre-defined severity threshold, automatically transmitting a text message alert for the vehicle condition to the cellular telephone.

In some embodiments, the text message may include instructions for addressing the vehicle condition(s). Additionally or alternatively, the text message may include information for obtaining a vehicle health report for the vehicle. The information for obtaining a vehicle health report for the vehicle may include a hyperlink to the World Wide Web.

Another aspect may include a computer-implemented method for monitoring vehicle health status for one or more vehicles. The method may include establishing a wireless communication with a cellular telephone located within a vehicle or in the vehicle vicinity.

Upon establishing the wireless communication, vehicle diagnostic information may be wirelessly transmitted to a telecommunications network for communication with a vehicle monitoring system.

At the vehicle monitoring system, the method may further include receiving information associating the handheld cellular telephone with a vehicle. The diagnostic information pertaining to a vehicle may be received. The vehicle diagnostic information may include one or more vehicle conditions.

The method may further include automatically determining a severity status for the one or more vehicle conditions based on a pre-defined set of severity status values for a plurality of vehicle conditions and transmitting a text message alert for the vehicle condition to the cellular telephone if the severity status for any of the vehicle conditions exceeds a pre-defined severity threshold.

In one embodiment, the method may further include activating one or more triggers from the vehicle and requesting a vehicle health status to be generated wherein the one or more triggers comprises a voice activated trigger or a button trigger.

These and other aspects of the present invention will be better understood in view of the attached drawings and following detailed description of the invention.

BRIEF DESCRIPTION OF THE DRAWINGS

The features of the present invention which are believed to be novel are set forth with particularity in the appended claims. The present invention, both as to its organization and manner of operation, together with further object and advantages thereof, may best be understood with reference to the following description, taken in connection with the accompanying drawings, which:

DETAILED DESCRIPTION OF THE VARIOUS EMBODIMENT(S)

As required, detailed embodiments of the present invention are disclosed herein. However, it is to be understood that the disclosed embodiments are merely exemplary of an invention that may be embodied in various and alternative forms. Therefore, specific functional details disclosed herein are not to be interpreted as limiting, but merely as a representative basis for the claims and/or as a representative basis for teaching one skilled in the art to variously employ the present invention.

Since a vehicle is a substantial investment, a typical vehicle owner expects that their investment last its useful life. In order to help a vehicle owner maintain their investment, automobile manufacturers, dealers, and service shops will regularly recommend vehicle diagnostic tests in order to detect potential problems with the vehicle. In some cases, the recommendation comes in the form of scheduled maintenances. At some point in the vehicle's life, however, an owner will still be confronted with an issue in their vehicle despite following the recommended schedule. Furthermore, the vehicle owner may be confronted with an issue that may be fatal to their vehicle. As most owners cannot self-diagnose problems with their vehicle, such incidents may result in a nonoperational vehicle and higher warranty costs for the automobile manufacturer if the issues is not addressed promptly. What is needed then is a tool for vehicle owners to be given notice of severe conditions with their vehicle, including the severity of the conditions, in order to preempt potential unrecoverable problems.

Figure 1:
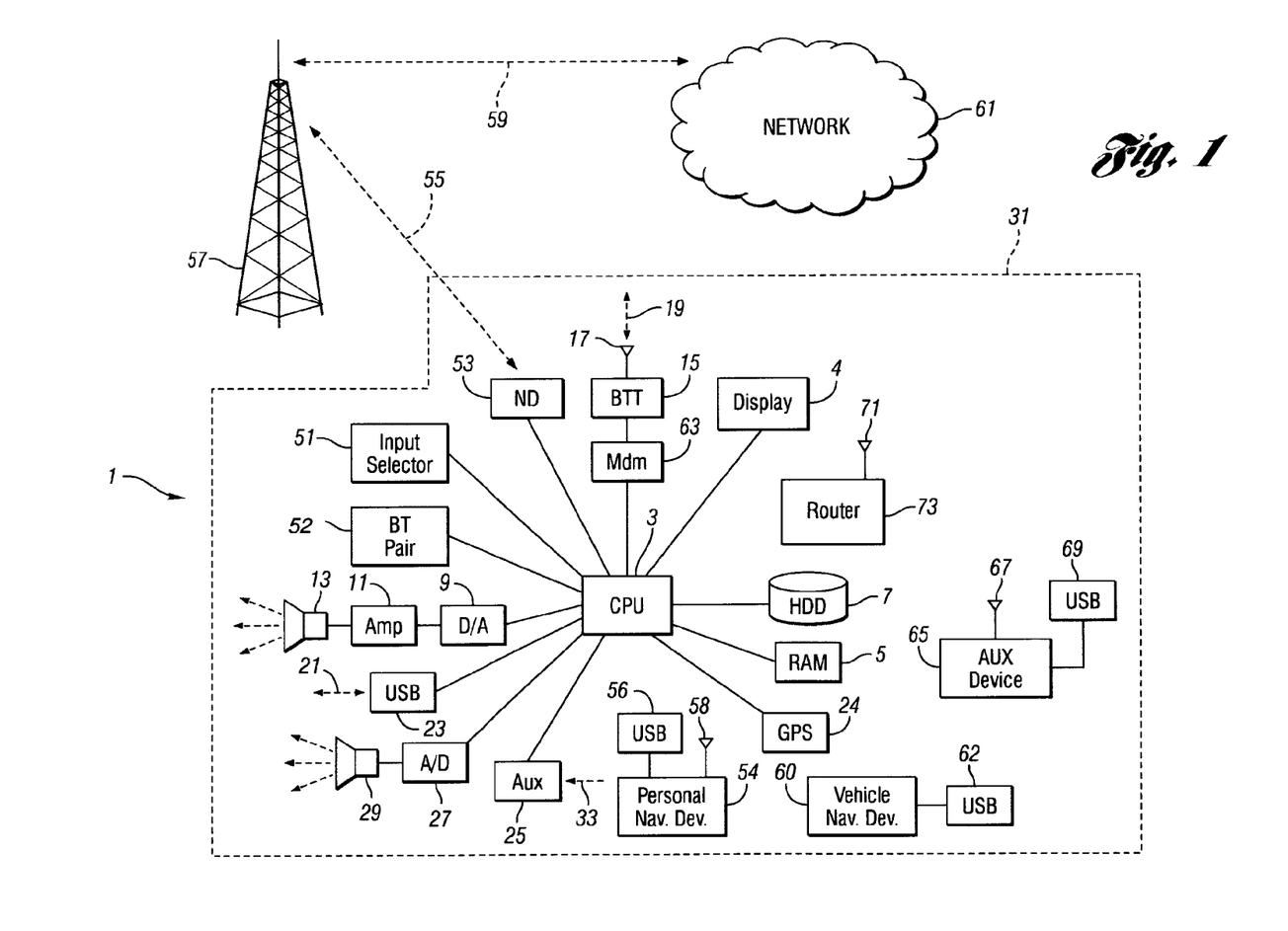
FIG. 1 shows an example block topology for a computing and communication system for a vehicle.

FIG. 1 illustrates an example block topology for a computing and communication system 1 (CCS) for a vehicle 31 for enabling, for example, diagnostic information to be transmitted from the vehicle to generate a vehicle health report. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, audible speech and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory.

The processor is also provided with a number of different inputs allowing the user to interface with the processor. In this illustrative embodiment, a microphone 29, an auxiliary input 25 (for input 33), a USB input 23, a GPS input 24 and a BLUETOOTH input 15 are all provided. An input selector 51 is also provided, to allow a user to swap between various inputs. Input to both the microphone and the auxiliary connector is converted from analog to digital by a converter 27 before being passed to the processor.

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, etc.). The nomadic device can then be used to communicate 59 with a network 61 outside the vehicle 31 through, for example, communication 55 with a cellular tower 57.

Pairing a nomadic device 53 and the BLUETOOTH transceiver 15 can be instructed through a button 52 or similar input, telling the CPU that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 in order to transfer data between CPU 3 and network 61 over the voice band. In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example).

If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is affixed to vehicle 31.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58; or a vehicle navigation device 60, having a USB 62 or other connection, an onboard GPS device 24, or remote navigation system (not shown) having connectivity to network 61.

Further, the CPU could be in communication with a variety of other auxiliary devices 65. These devices can be connected through a wireless 67 or wired 69 connection. Also, or alternatively, the CPU could be connected to a vehicle based wireless router 73, using for example a WiFi 71 transceiver. This could allow the CPU to connect to remote networks in range of the local router 73.

Figure 2:
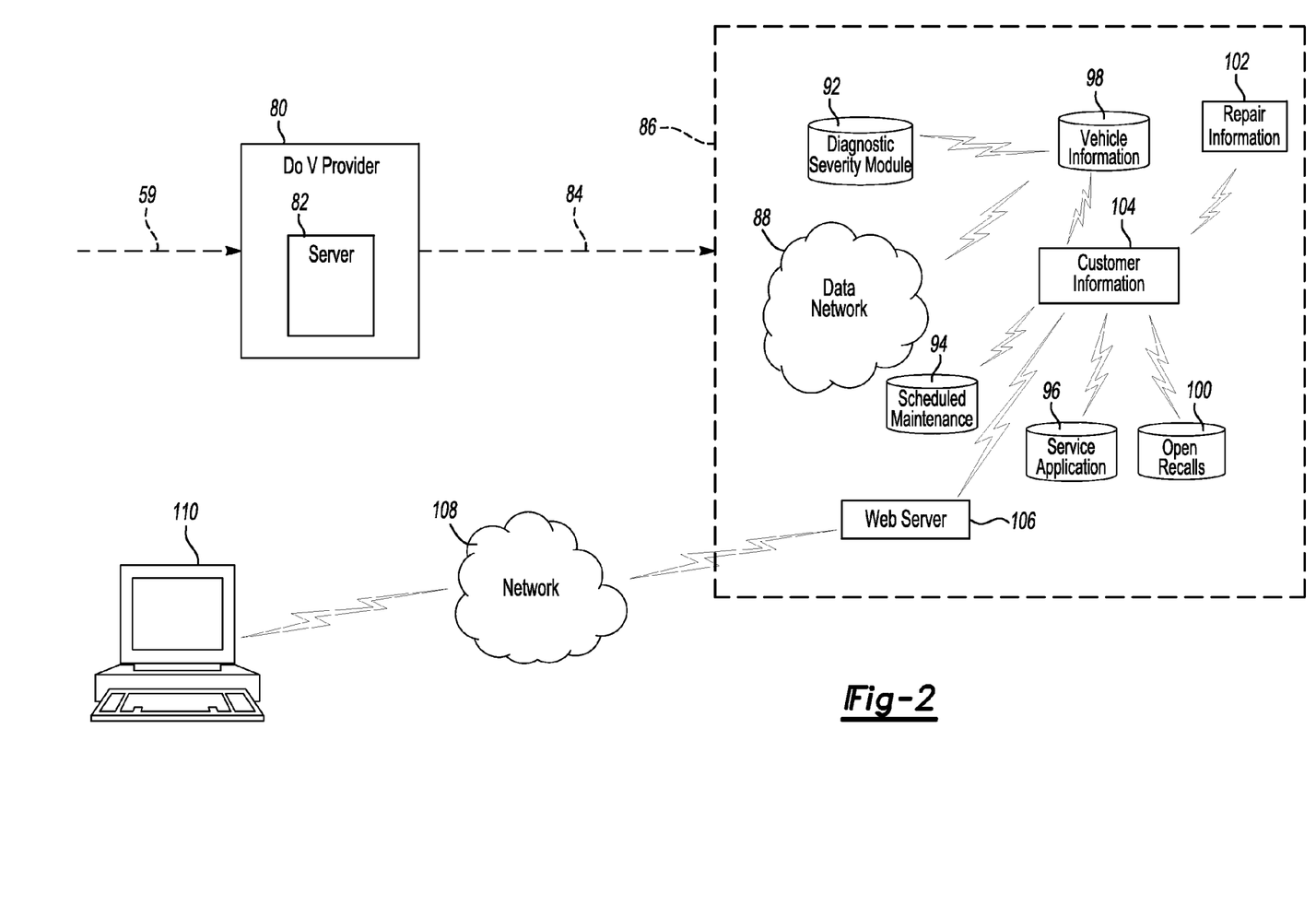
FIG. 2 shows an exemplary system for performing vehicle diagnostics according to one of the various embodiments of the present invention.

FIG. 2 is an embodiment of the system topology for accomplishing the operation of the various embodiments of the present invention. A driver or passenger inside a vehicle 31 will pair his or her nomadic communication device 2 (e.g., cell phone) with the vehicle's BLUETOOTH transceiver 15 in order to accomplish data transmission to and from the vehicle 31. Nomadic communication device (NCD) 2, once paired, may transmit and receive data through telecommunication network 55, 59 (e.g., a cellular network) by communicating with a data provider 80. Data may be communicated in several ways to/from data provider 80. In one embodiment, a broadband RF connection is utilized. In another embodiment, a data-over-voice connection is implemented in which data is modulated into encoded audio signals that are communicated over the traditional voice band of the cellular telephone network.

Data provider 80 communicates with a vehicle monitoring system 86 through connection 84 for transmitting vehicle and vehicle health information. Connection 84 may be a network connection (e.g., broadband) and may be a wired or wireless connection. In one embodiment, data provider 80 may receive audio signals from the NCD 53 and convert the received signals into a digital format for communication with one or more subsystems of vehicle monitoring system 86.

Vehicle monitoring system 86 may be comprised of one or more subsystems communicating over a data network 88. In one embodiment, data network 88 may facilitate transmission of information between vehicle monitoring system 86 and the CCS 1 and/or NCD 53 (e.g., text messages). One subsystem may be subsystem 98 having a plurality of predefined severity values for diagnostic information of a vehicle and information relating to a vehicle (referred to in FIG. 2 as "Vehicle Information"). In one embodiment, subsystem 98 may be in further communication with diagnostic severity module 92 in which subsystem 98 may be an interface (e.g., webpage) for retrieving data from module 92 (e.g., a database). Other non-limiting examples of subsystems may include subsystem 94 for generating and retrieving vehicle maintenance information (referred to in FIG. 2 as "Scheduled Maintenance"), subsystem 96 for scheduling a vehicle service at a dealership (referred to in FIG. 2 as "Service Application"), subsystem 100 for determining vehicle open recalls, subsystem 102 for determining vehicle repair order data (i.e., history of repairs status for a vehicle) (referred to in FIG. 2 as "Repair Information"), and subsystem 104 for interfacing between the user/driver and the vehicle monitoring system (referred to in FIG. 2 as "Customer Information") through server 106.

In one embodiment, further subsystems may include a subscriptions database and an inventory database (not shown) accessible by, for example, dealerships and OEMs to assess the inventory of vehicles sold (e.g. vehicles having a CCS 1). The subscriptions database may be a subscription maintenance system to determine subscribers of the CCSI.

In one embodiment, subsystem 104 may be a software processing engine or application which, for example, may generate reports of vehicle diagnostics displayed through server 106 (e.g. a web server) in communication with user terminal 110 through connection 108 (e.g. LAN, WAN, GAN). The processing engine 104 may be in communication with a data file (not shown) which, for example, may store customer profile information. In another embodiment, subsystem 104 may be a central subsystem with which the other subsystems 94, 96, 98, 100, 102 and 106 may communicate, for example, in a hub-and-spoke arrangement over a communication network 88 (e.g. intranet or internet). It should be understood that subsystems 94, 96, 100, 102, 104 and 106 are not required to be mutually exclusive subsystems nor are they required to be separately arranged. Various arrangements of the subsystems may be made without destroying the intent of the various embodiments of the present invention.

Vehicle monitoring system 86 may be connected to a user terminal 110 through network 108. Network 108 may be any data or network connection (e.g., broadband or dial-up) and may be wired or wireless. User terminal 110 may be operable to receive and display a vehicle diagnostics notification (as will be further described below). In one embodiment, terminal 110 is in communication with server 106.

Figure 3:
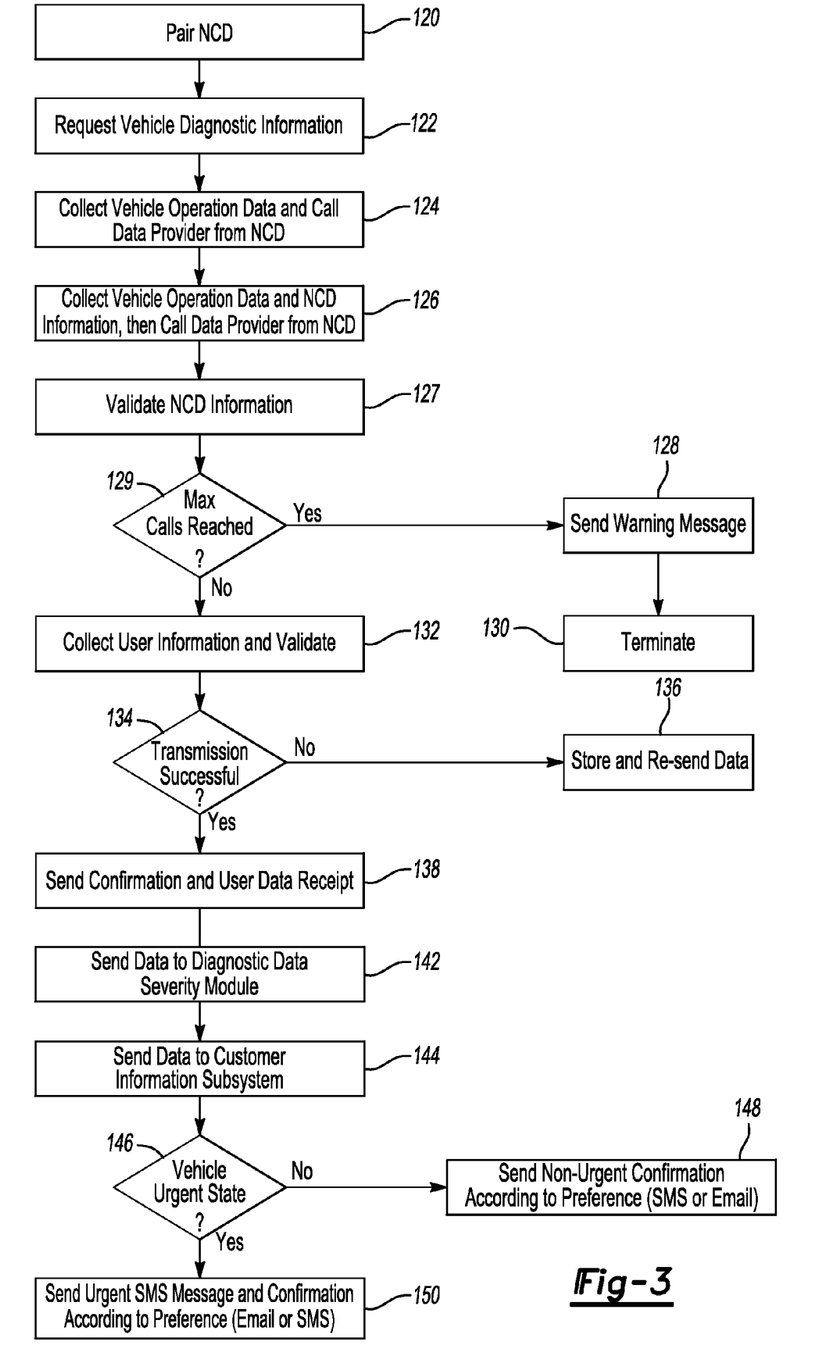
FIG. 3 shows an exemplary method for performing vehicle diagnostics according to one of the various embodiments of the present invention.

FIG. 3 is a block diagram illustrating an embodiment of the operation according to one exemplary embodiment of the invention. In one embodiment, a computer program product (i.e., computer software) having instructions embodied in a computer readable medium may include instructions for performing the operation of the invention according to one of the various embodiments.

A wireless (e.g., BLUETOOTH) connection may be established between the vehicle's transceiver 15 and the occupant's nomadic communications device (NCD) 53 as in block 120. The connection provides for data transmission between the NCD 53, the vehicle's CCS 1, and the vehicle monitoring system 86 through data provider 80. In one embodiment, pairing may be accomplished by selecting a BLUETOOTH input at the CCS 1 interface. In another embodiment, BLUETOOTH transceiver 15 continuously monitors for a pairable device without user intervention. The BLUETOOTH transceiver 15 may then search for the pairable mobile device. Pairing may occur during any period of vehicle occupancy.

A request for vehicle diagnostics may be activated as in block 122 automatically (e.g., vehicle diagnostics notification is transmitted every 5000, 7500, or 10,000 miles) or manually (e.g., the occupant may press a button located on the vehicle's steering wheel or speak the request received by microphone 29). In one embodiment, an automated prompt set by the user (e.g., from a user-accessible website) may be transmitted periodically reminding the user to run a report.

In one embodiment, when a request is automatically triggered, the data packet containing the vehicle diagnostics information may be held until a BLUETOOTH connection is established or, if already established, when the connection is free (e.g., a live voice connection has ended).

Once the connection is made to data provider 80, a prompt or message may be sent to the user to approve data transmission of the vehicle diagnostic information as in block 124.

If the vehicle diagnostics notification is triggered manually, upon initiating the request, a user may receive a prompt to confirm the data transmission via voice or by pressing a button as in block 124. If the transmission fails, the occupant may be notified of the failure and may be given another opportunity to resend the transmission.

Upon making a request (i.e., either manually or automatically) and transmission of the confirmation message, CCS 1 may collect vehicle diagnostic information (e.g., diagnostic trouble codes) from the vehicle's CAN bus (not shown) and organize the information into one or more data packets as in block 126. A user's NCD identifier (e.g. mobile identification number) may also be collected. In one embodiment, the data packets are held in a data buffer or persistent memory 7 in case re-transmission of the data is required (e.g., due to transmission errors).

CCS 1 may collect vehicle diagnostic data in a general priority sequence determined by an original equipment manufacturer (OEM). Alternatively or in addition, the CCS 1 may prioritize the retrieval of the information according to the severity of the issue status at the vehicle 31. Priority of retrieval may also be based on data packet size (e.g., if the maximum data packet size is exceeded, then the vehicle diagnostic information is retrieved and transmitted according to the importance of the information). Information in the data packet may include, but is not limited to, Vehicle Identification Number (VIN), Odometer reading, warning status indicators, and vehicle diagnostic trouble codes.

CCS 1 may command the user's NCD to place a call to the data provider 80 (e.g., via a toll free 800 call) in order to generate a connection for data transmission as in block 126. In some embodiments, connection may be made to data provider server 82. In block 127, the user's NCD identifier (e.g. mobile identification number) may be validated.

The data provider 80 may facilitate the inbound and outbound transmission of vehicle diagnostic data via the occupant's NCD 53. The data provider may also determine whether to make the connection as in block 129. For example, the data provider 80 may restrict the call based on a predetermined maximum daily transmission. The data provider 80 may send a warning message to the occupant's NCD 53 as in block 128 and discontinue processing once the maximum limit is reached as in block 130. A message may include, but is not limited to, a line disconnect, a DTMF tone, a text message, and a message in a spoken language transmitted from CCS 1.

If the maximum count has not been reached as in block 129, information pertaining to the vehicle 31 (e.g., a vehicle identification number or VIN) and the NCD 53 may be collected and validated (e.g., the user's NCD identification) as in block 132. In one embodiment, as in block 127, the data provider 80 in communication with vehicle monitoring system 10 may validate the NCD identification information through a verification tool (not shown) for validating requesting users before determining whether the maximum calls have been reached.

In one embodiment, NCD verification may facilitate confirmation that a user can receive vehicle diagnostic information. A user/driver may be verified through a table look up. For example, upon making a request for vehicle diagnostic information, data provider 80 may use an NCD identifier (e.g., a mobile identification number) to conduct a check that the user is listed in one of at least three categories. For example, there may be a category for users that have not subscribed to the service for receiving vehicle diagnostic information. There may also be a category for subscribed users. There may also be a category pertaining to first time users. A first time user may be able to receive vehicle diagnostic information, but required to subscribe to the health report service in order to receive future diagnostic information. In one embodiment, the user may then be transferred to the "not subscribed" category until he or she subscribes.

The vehicle diagnostic data may be transmitted from persistent memory 7 of the CCS 1 to the data provider 80. A determination may be made by the data provider 80 as to whether there was successful transmission of the data as in block 134. An unsuccessful transmission may cause the CCS 1 to store the information and re-transmit to the data provider as in block 136. Upon successful transmission, data provider 80 may transmit the diagnostic information to vehicle monitoring system 86.

The diagnostic information may include an associated NCD identifier. The raw data may be transmitted in Extensible Mark-up language (XML) format. The diagnostic data may then flow to subsystem 98 as in block 142. The diagnostic data may then be sent to the customer information subsystem 104 as in block 148. In one embodiment, subsystem 104, may serve as an interface between the user/driver and the vehicle monitoring system 86 including subsystems 94, 96, 98, 100, 102 and 106. For example, data may be inputted from and/or outputted to one or more of subsystems 94, 96, 98, 100, 102, and 106 to and/or from subsystem 104 in order to inform a user at one or more terminals (e.g., NCD 53 and/or user terminal 110) of health related information pertaining to the vehicle (e.g., diagnostics, service appointments, repair order date, and open recalls).

Upon receiving the diagnostic information, vehicle monitoring system 86 (e.g., subsystem 104) may check whether the vehicle is in a severe (i.e., critical) state as in block 146. For example, in one embodiment, subsystem 104 may communicate with subsystem 98 for determining urgent vehicle diagnostics. Upon receiving diagnostic information, a check may be made at subsystem 98 for any severe diagnostic information included in the diagnostic information received at subsystem 104. In one embodiment, subsystem 98 may be a gateway (e.g., webpage) to access subsystem 92 (e.g., a database) which may include predefined severity status values for determining the severity status of one or more vehicles. Diagnostic information including severity values may be received by subsystem 104 for notifying the user at NCD 53 (e.g., via text message) of a severe diagnostic condition of the vehicle as in block 150. The user may also be notified of severe vehicular conditions at user terminal 110 (e.g., via a vehicle health report) accessible via the World Wide Web (WWW). Further details of the severe status notification will be further described below.

If the vehicle is not in a severe condition, vehicle monitoring system 86 (e.g., subsystem 104) may send a notification to the user at one or more terminals (e.g., NCD 53 and/or terminal 110) relating to vehicle diagnostics such as vehicle health reports. For example, the user may be sent an SMS and/or an e-mail indicating that a report of vehicle diagnostics can be viewed at a website as in block 148. The website may be restricted to members. In one embodiment, the vehicle diagnostics notification may only be available for a predetermined time (e.g., 6 months).

The user may log on to the website directly, click on a hyperlink placed in their e-mail message or in a text message to retrieve the report, or follow a URL address in the text message by, for example, copying and pasting the URL to their web browser. The user may then log on to the website using their NCD identifier (e.g., cellular number) and password. The vehicle diagnostics notification data may be provided to the website as an XML message and formatted as an HTML page.

If a severe vehicle condition is encountered as in block 146, a text message may be received by the user on his or her NCD 53 indicating a severe status of the vehicle as in block 150. In one embodiment, a user may suppress this notification feature according to his or her preferences that may be defined from CCS 1 or terminal 110. In one embodiment, the preferences may be stored in subsystem 104 or in a customer profile database (not shown) in communication with subsystem 104. Diagnostic information that is severe and negatively affects the vehicle's health may be flagged. For example, in one embodiment, severe vehicle diagnostic information may be associated with predetermined severity values. Accordingly, a check may be made by vehicle monitoring system 86 (e.g., at subsystem 104 in communication with subsystems 98 and/or 92) for determining the severity status of the diagnostic information through, for example, a look up table in subsystem 92. The severity status values may be pre-defined by an OEM and defined by, for example, a severity rating (e.g., using numerical values on a scale of 1-3 where 2 and 3 are "severe"). The severity value may be predetermined based on, for example, the detriment the problem placed on the vehicle, the effect the problem may have on warranty costs for an OEM, the possibility of total failure of the vehicle, and/or the danger to the vehicle occupants.

Vehicle diagnostic information surpassing a predefined threshold (e.g., a numerical threshold such 2 or 3) may be returned to vehicle monitoring system 86 as being "severe." This result may then be transmitted to the user as a notification (e.g., at NCD 53) so that the user is given notice of potential detrimental problems to his or her vehicle. The user may also be notified that the problem requires the user's immediate attention.

Operation of the urgent message feature can be illustrated through the following example. If a driver notices that his/her temperature light indicator is illuminated, but does not know the extent of the overheating problem, he/she may trigger the vehicle health monitoring system from the steering wheel or through a voice request. A data packet may be released from the CCS 1 which may include, but is not limited to, the VIN, NCD identifier, the vehicle mileage data, and diagnostic information. Vehicle monitoring system 86 may receive this information, check for the presence of any severe conditions (as described above) and may return an SMS message back to the occupant informing them of any severe conditions in the vehicle if present. The SMS may also include information for addressing the severe condition. In appropriate conditions based on predefined criteria, the driver may also be informed if it is an emergency/urgent problem and that immediate action should be taken (e.g., servicing to their preferred dealer).

In one embodiment, in either a severe or non-severe case, the notification received by the user may include a uniform resource locator (URL) address or hyperlink to the user to access a vehicle health report. If the user has not yet registered as a member on the website, an additional notification may be sent to the user to register on the website in order to view their vehicle health report. Upon registering, the user may view pre-registration requested health report (e.g., the most current health report). In one embodiment, the user may view the vehicle diagnostics notification on either the website or his/her mobile device (e.g., as a text message).

Figure 4:
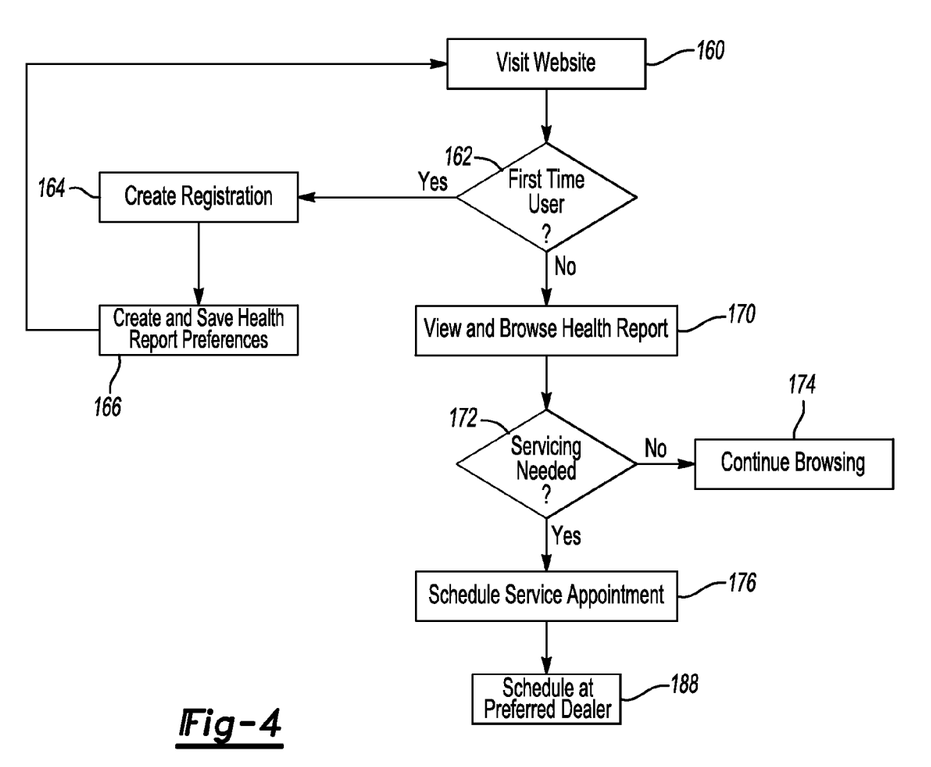
FIG. 4 shows another exemplary method for performing vehicle diagnostics according to one of the various embodiments of the present invention.

FIG. 4 is a block diagram illustrating the operation of the health report retrieval according to one embodiment. Upon receiving a notification of the presence of a report, the user may visit the website to retrieve their vehicle diagnostics notification as in block 160. If the user is a first-time user as in block 162, the user may be required to register as in block 164 including creating a profile as in block 166. Creating the profile may generate an association of the vehicle with the driver (e.g., through the NCD identifier and/or the VIN).

From the website, a user may associate multiple VINs with one NCD identifier. For example, if a family has two cars, the primary account holder of one car (e.g., a husband), may add his wife's VIN to his account. Similarly, the wife, who will be the primary account holder associated with her car, can add the husband's VIN of his vehicle to her account. In this way, if either driver activates the vehicle diagnostics notification system, either driver will be recognized by the system by the association of the vehicle's VIN with the NCD identifier (e.g., mobile number).

A user may also configure his or her preferences from the website. Non-limiting examples may include his or her preferred mode of communication (e.g., e-mail or SMS), driving conditions (e.g., dusty environment), the type of terrain on which he or she travels, health report suppression (e.g, if the user would not like to receive vehicle diagnostics notifications), request for an SMS urgent alert and their preferred servicing dealer.

In one embodiment, prior to finalizing registration, a user may be presented with an end-user license agreement informing the driver of the terms and conditions of their use of the system. Acceptance of this agreement may be required before the user's registration can be accepted and activated.

A user may visit the website to access the vehicle diagnostics information. The vehicle diagnostics information may be based on the latest vehicle diagnostic data (e.g., since the time a request for the vehicle diagnostics notification was transmitted) and include information relating to vehicle diagnostics, scheduled maintenance, dealer generated service history information (e.g., unfulfilled maintenance issues), and vehicle recalls. In one embodiment, the vehicle diagnostics notification may be a webpage integrally containing all the information. The webpage may also be converted to a printable HTML format.

The user may directly access the vehicle diagnostics information as in block 170 through a URL or hyperlink in his or her email or text message, or from a related webpage (e.g., and OEM website).

The vehicle diagnostics notification may include the vehicle's open (i.e., unserviced) maintenance schedules from which a user may (as in block 176) or may not (as in block 174) choose to schedule a service maintenance. The user may schedule a servicing from the website. The user may schedule a service with their preferred dealer as in block 186. The user may then be directed to their preferred dealer's website or provided contact information for their dealer to schedule an appointment. In one embodiment, if a user has not provided a preferred dealer (established while setting health report preference as in block 166), the user may be required to provide one based on local dealers in the area. A user may be given the opportunity to change their preferred servicing dealer.

While the best mode for carrying out the invention has been described in detail, those familiar with the art to which this invention relates will recognize various alternative designs and embodiments for practicing the invention as defined by the following claims.

What is claimed:

1. A system for monitoring vehicle health status for one or more vehicles, the system comprising:
   a vehicle monitoring computer system configured to:
   (1) receive telephone identifying information and wirelessly connect to an identified telephone,
   (2) verify a user's eligibility to request a diagnostic report, based at least in part on the connected telephone identifying information,
   (3) receive vehicle diagnostic information, including one or more vehicle conditions, responsive to a user-initiated diagnostics request made at the vehicle,
   (4) determine a severity status for the one or more vehicle conditions,
   (5) if the severity status for any of the vehicle conditions exceeds a pre-defined severity threshold, transmit a text message alert for the vehicle condition to the identified and connected telephone, and
   (6) transmit a text message report relating to the vehicle diagnostic information to the identified and connected telephone, responsive to the received user request for diagnostics.

2. The system of claim 1 additionally comprising a vehicle computer system configured to communicate wirelessly with the telephone located within the vehicle, or in the vehicle vicinity, to transmit the vehicle diagnostic information wirelessly to a telecommunications network for communication to the vehicle monitoring system.

3. The system of claim 1 wherein the vehicle monitoring system associates the telephone with the vehicle by associating a telephone number with a vehicle identification number.

4. The system of claim 1 wherein the text message alert additionally includes an instruction for addressing the vehicle condition(s).

5. The system of claim 1 wherein the text message alert includes information for obtaining a vehicle health report for the vehicle.

6. The system of claim 5 wherein the information for obtaining a vehicle health report for the vehicle includes a hyperlink to the World Wide Web.

7. The system of claim 1 further comprising one or more triggers that are activated from the vehicle and configured to initiate the user request for diagnostics responsive to activation by a user.

8. The system of claim 7 wherein the one or more triggers include a voice activated trigger or a button trigger.

9. A computer program product embodied in a computer readable medium having computer readable instructions for monitoring vehicle health status for one or more vehicles, the computer program product comprising instructions for:
   receiving telephone identifying information;
   wirelessly connecting to an identified telephone;
   verifying a user's eligibility to request a diagnostic report, based at least in part on the connected telephone identifying information;
   receiving vehicle diagnostic information, including one or more vehicle conditions, received responsively to a user request for diagnostics;
   determining a severity status for the one or more vehicle conditions;
   if the severity status for any of the vehicle conditions exceeds a pre-defined severity threshold, transmitting a text message alert for the vehicle condition to the identified and connected telephone; and
   transmitting a text message report relating to the received diagnostic information to the identified and connected telephone.

10. The computer program product of claim 9 further comprising instructions for associating the telephone with the vehicle by associating a telephone number with a vehicle identification number.

11. The computer program product system of claim 9 further comprising instructions for including instruction in the text message alert for addressing the vehicle condition(s).

12. The computer program product of claim 9 further comprising instructions for including information for obtaining a vehicle health report for the vehicle in the text message alert.

13. The computer program product of claim 12 wherein the information for obtaining a vehicle health report for the vehicle includes a hyperlink to the World Wide Web.

14. The computer implemented method of claim 9 further comprising activating one or more triggers from the vehicle to generate the user request for diagnostics, wherein the one or more triggers comprises a voice activated trigger or a button trigger.

15. The system of claim 1, wherein the text message alert and the text message report are part of a single text message.

16. The system of claim 1, wherein the number to which the text message alert or text message report is to be transmitted is obtained as part of the identifying information identifying the connected telephone.

17. The system of claim 1, wherein the number to which the text message alert or text message report is to be transmitted is obtained as part of the identifying information identifying the connected telephone.

* * * * *